United States Patent [19]

Boyer et al.

[11] Patent Number: 4,600,271
[45] Date of Patent: Jul. 15, 1986

[54] HEAD-UP DISPLAY

[75] Inventors: Claude Boyer, Merignac; François H. Gauthier, Boulogne Billancourt; Jean-Pierre Gerbe, Pessac, all of France

[73] Assignee: Thomson CSF, Paris, France

[21] Appl. No.: 584,909

[22] Filed: Feb. 29, 1984

[30] Foreign Application Priority Data

Mar. 7, 1983 [FR] France .................... 83 03699

[51] Int. Cl.$^4$ ............................... G02B 27/10
[52] U.S. Cl. .................... 350/174; 358/104; 358/250; 350/372
[58] Field of Search ............ 350/172, 173, 174, 3.72, 350/412, 601; 358/238, 250, 104

[56] References Cited

U.S. PATENT DOCUMENTS

| | | | |
|---|---|---|---|
| 3,549,803 | 12/1970 | Becht et al. | 350/174 |
| 3,659,920 | 5/1972 | McGlasson | 358/104 |
| 3,785,715 | 1/1974 | Mecklenborg | 358/104 |
| 4,060,835 | 11/1977 | Gdovin | 358/104 |
| 4,269,476 | 5/1981 | Gauthier et al. | 350/174 |
| 4,290,669 | 9/1981 | Belva et al. | 350/174 |
| 4,383,740 | 5/1983 | Bordovsky | 350/504 |

FOREIGN PATENT DOCUMENTS

| | | |
|---|---|---|
| 1589907 | 5/1970 | France . |
| 2017377 | 5/1970 | France . |
| 2441191 | 6/1980 | France . |
| 1282425 | 7/1972 | United Kingdom . |
| 0009332 | 4/1980 | United Kingdom . |
| 0077193 | 4/1983 | United Kingdom . |

OTHER PUBLICATIONS

"Machine Design" vol. 52, 1980, pp. 36–40.

Primary Examiner—Jon W. Henry
Attorney, Agent, or Firm—Cushman, Darby & Cushman

[57] ABSTRACT

Display adapted to the local configuration, so that it does not cause a mask during observation. It comprises an entirely transparent optical module grouping a spherical mirror, which is preferably a partly transparent diffractive optics used on the axis, and a partly transparent flat mirror inclined with respect to the axis. The mirrors are joined at the bottom by a bonded plate and assembled at the top by a thin part, whose faces pass through the centre of the spherical mirror. The electronic part is essentially located in a case, whose shape is such that it is located in the natural mask of a pillar of the cockpit. The display is also used for helmet displays.

12 Claims, 6 Drawing Figures

FIG_1
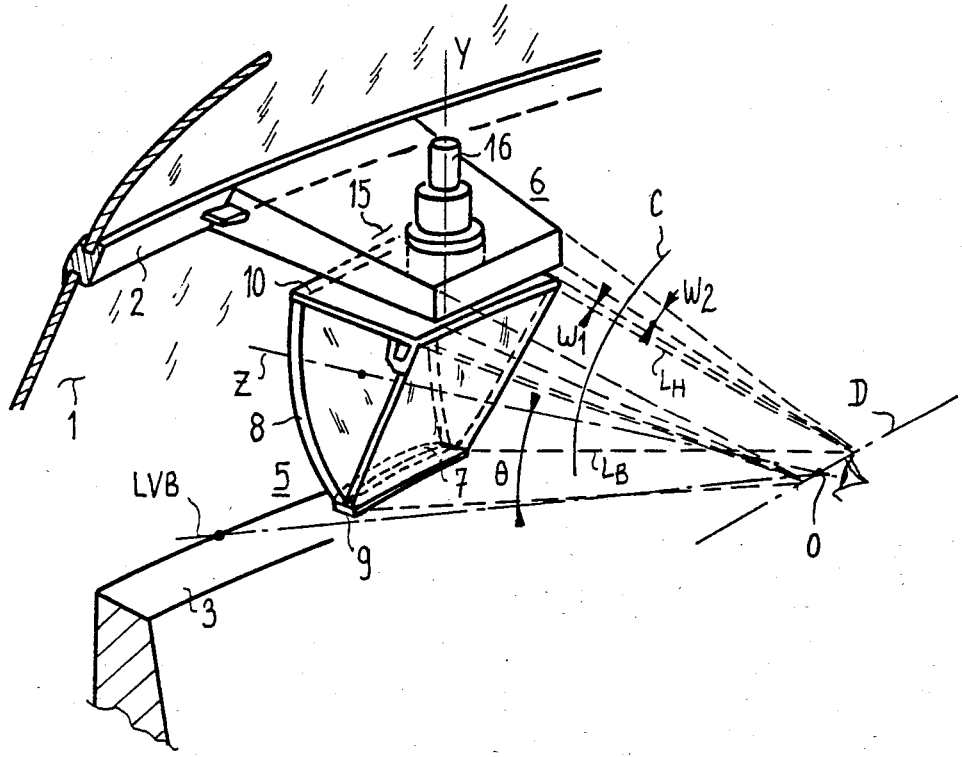
FIG_4
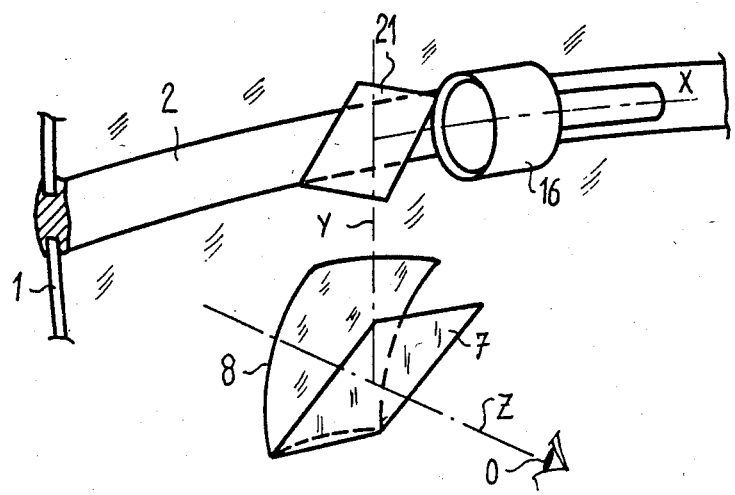

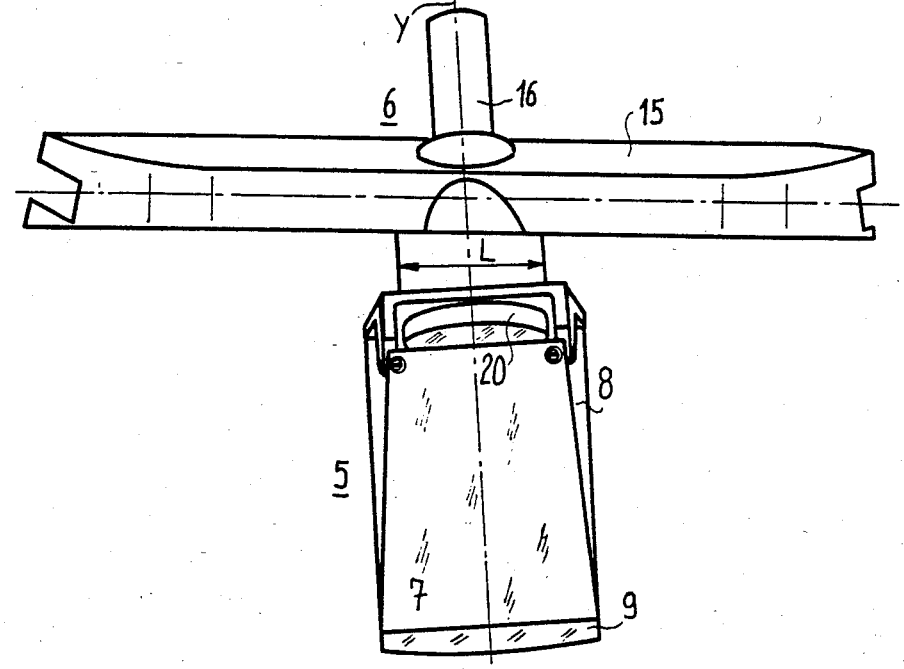
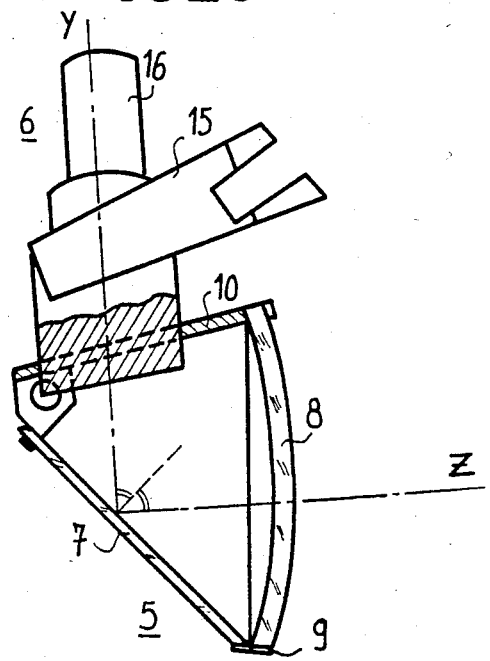

FIG_5-a
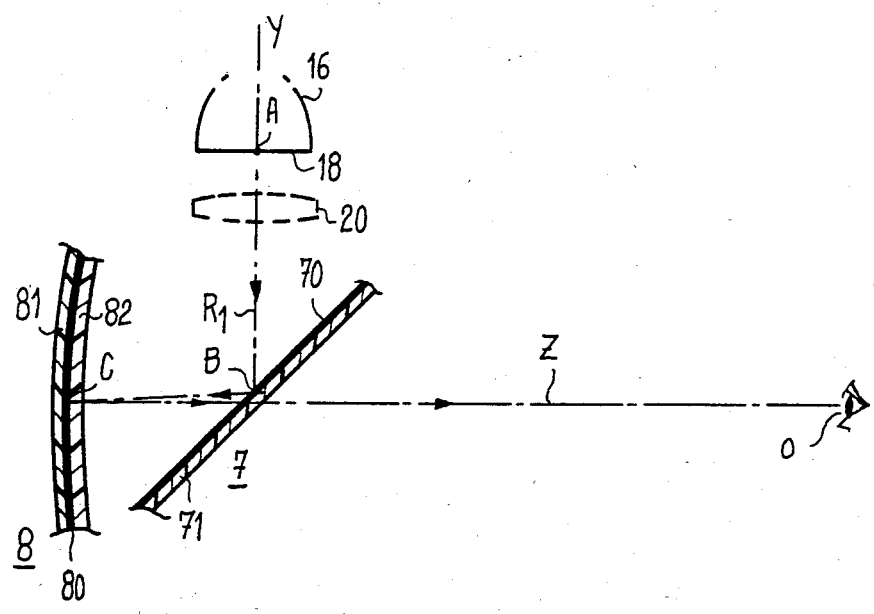
FIG_5-b
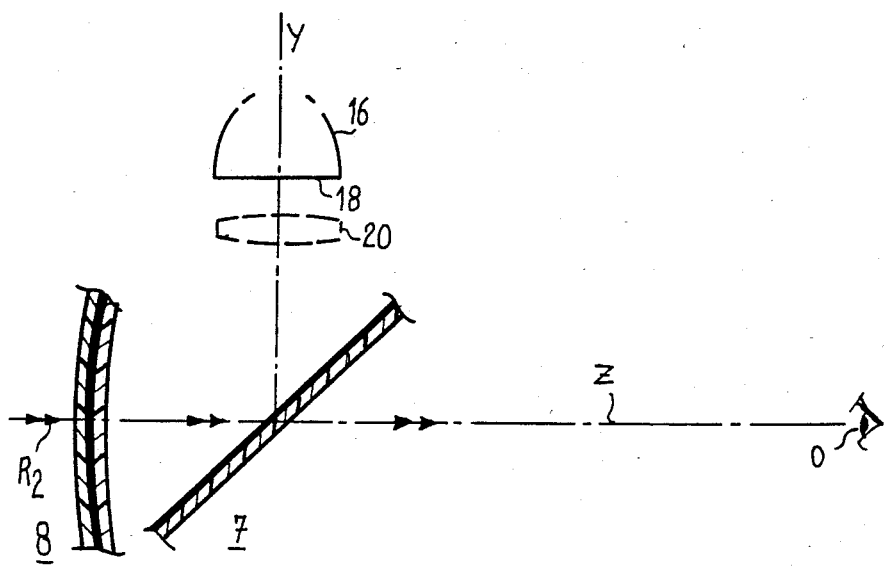

HEAD-UP DISPLAY

BACKGROUND OF THE INVENTION

The present invention relates to a display means making it possible to observe a synthetic image which is collimated and superimposed on the natural view of the landscape. These means, which are generally used on board aircraft, are often called head-up displays or HUD to distinguish them from the head-down display of means provided on the instrument panel.

The invention is more particularly intended for airborne use, particularly for use in a helicopter, in order to provide both a firing sight unit and a flying instrument, i.e. the flight collimator.

These means generally comprise an image combining optical system for transmitting to the observer the radiation coming from the landscape and for reflecting to the observer the radiation corresponding to a synthetic image to be displayed. The latter is produced by an optical collimator incorporating an optical lens and bright objects representing the symbols to be displayed and which are positioned in the focal plane of the lens. For this purpose, the bright object generating means generally use a cathode ray tube, the figuring of the symbols represented on the screen being reflected to infinity by the lens.

According to conventional solutions, the combining optics comprises a partly transparent glass plate, or several parallel plates for increasing the optical pupil and consequently the instantaneous field without changing the diameter of the collimating optics.

In such equipment, the cathode ray tube with the associated circuits (supply, scanning, etc) and the collimating optics are placed in a box or case, which is also mechanically connected to the image combining optics. This case as well as the mechanical mounts or pillars supporting the combining optics provide a mask, which can be of considerable size, due to the overall dimensions of the case. The effect of large mask (hereinafter, mask effect) can be very operationally prejudicial and dangerous if it is located in the field of vision of the observer.

Moreover, from the aircraft side, helicopters are essentially characterized by a large canopy, and flying conditions (particularly tactical flying conditions) in which the mask introduced by a head-up display means must be minimized in size, even when installed in the upper part of the cabin.

The object of the invention is to provide a head-up display meeting these requirements, whilst being adapted to the configuration of the aircraft where it is to be installed, in such a way that the mask produced by it almost completely coincides from the observer's standpoint with a natural mask existing in the cabin, which means that there is a virtually maskless display, which does not limit the field of observation. The display is more particularly intended for installation in the upper part of the cabin.

According to the known display techniques, a spherical reflector forms the collimating optics. In accordance with the so-called "on the axis" use, adjacent to the reflecting spherical optics is located a partly reflecting glass plate, which combines the images. According together quasi-axial solutions corresponding holographic optics are used having a first diffracting element in the form of a spherical glass and at least one second diffracting element formed by a flat glass, the assembly ensuring the collimation and image combination function.

A system of this type is described in European Patent Application No. 0,009,332. The head-up display is intended for operation in a low position, the cathode ray tube being installed on the instrument panel. The optical unit constituted by the holographic optical elements is essentially placed in the visual field of observation and is rigidly fixed by the bottom and laterally to the case and to the instrument panel.

It is not really possible to transpose this solution as such for the requirements of head-up operation, particularly on board a helicopter, in view of the considerable mask effect. The optical module comprises the spherical diffracting element and the planar diffracting element assembled so as to have in cross-section a substantially triangular structure, each forming a side of a triangle, whose third side is constituted by a mechanical supporting element or part of the case. This solution does not permit an on the axis use, the radiation from the cathode ray tube having to pass through the spherical mirror and then has to be reflected twice, by the flat mirror and the spherical mirror, before finally passing through the flat mirror.

SUMMARY OF THE INVENTION

The present invention is directed at a head-up display incorporating optical collimation and image combination means for displaying at infinity the brightness or light data and for observing the same superimposed on the landscape, electronic means for producing the data to be displayed, and a case for supporting the assembly and for fixing it to the carrier vehicle, the optical means incorporating two partly transparent mirrors, one being spherical and the other flat and which are juxtaposed by one end and are spaced from one another by the opposite end. The said juxtaposed ends are assembled by a limited thickness part and are oriented downwards for a head-up installation of the display, said optical means being supported and mechanically joined to the case by a connecting part, which is also of limited thickness and substantially contained in a plane passing through said opposite ends and which intersects the optical axis of the system at an observation point corresponding to the centre of the spherical mirror. Thus, the latter can be used on the axis and there is virtually no mask effect by the optical means in the field of observation located below said connecting part.

BRIEF DESCRIPTION OF THE DRAWINGS

The invention is described greater detail hereinafter relative to non-limitative embodiments and the attached drawings, wherein show:

FIG. 1 a head-up display according to the invention installed in a helicopter cabin.

FIGS. 2 and 3 the head-up display of FIG. 1 in an elevation and side view respectively.

FIG. 4 a partial diagram relating to an installation variant for the cathode ray tube of the display of FIG. 1.

FIGS. 5A and 5B, diagrams relating to the paths of the radiation of the image to be collimated and that coming from the external landscape respectively.

DETAILED DESCRIPTION OF THE INVENTION

As can be seen in FIG. 1, the head-up display is installed in the upper part of a helicopter cabin between the canopy 1, supported by mounts or pillars, such as 2, and the observer, who is symbolized by the eye located at point 0. The instrument panel 3 defines the limit of downwards visibility LVB for observation from 0 of the external landscape through the canopy. The observer's position 0 is predetermined by the configuration of the equipped cockpit and consequently by the type of aircraft. The display is provided as a consequence of this. Circle C defines a free displacement area from 0 for the pilot's head, whereby said area must be free from all equipment. The display comprises an optical collimation and combination module 5, surmounted by an electronic module 6.

Optical module 5 is located in the field of observation from 0 and passes through canopy 1, directions LH and LB representing the upper and lower display limits respectively. The field of observation of the collimated image consequently also has a vertical field with a corresponding angle, which can easily reach about 20°, which permits an extensive operation (use as a flight collimator, display of flight data, approach and landing information, etc).

The optical module 5 comprises an optical structure with two partly transparent elements, a flat mirror 7 and a spherical mirror 8. A small or thin plate 9, with a suitable adhesive system, constitutes the fixing means for optical elements 7 and 8 at their lower end, where they are juxtaposed. Plate 9 has a limited thickness in the vertical direction Y, represented in order not to introduce any mask effect for observation from 0. It is preferably made from a transparent material in order to further increase the impression of the absence of any mask in the field of vision. A mechanical part 10 is used in the upper portion in order to connect the opposite ends of the mirrors, which are remote from one another, so as to support the assembly and join it to the electronic module 6. The part 10 has a limited thickness and can be likened to an inclined plane relative to the optical axis Z of the system, so as to pass substantially through point 0, whereby the upper and lower faces of said part can be parallel, or are preferably machined in such a way as to form a dihedron, whose line D passes through 0. Thus, the corresponding field of observation w1 is very small for external vision and is not involved in the perception of the collimated image, being located above the upward display limit LH. Spherical mirror 8 can be a conventional optical element, or a holographic optical element fulfilling an equivalent function. Mirror 8 is used on the axis, which makes it possible to minimize the aberrations encountered when used non-axially or quasi-axially. The centre of curvature is located at point 0 corresponding to the optimum location on the optical axis Z of the optical system, which makes it possible to limit field aberrations (coma, astigmatism).

The triangular structure constituted by optical elements 7, 8 and fastenings 9, 10 has a high level of rigidity and a good vibration behaviour. Thus, this structure is completely transparent, at least with regards to its useful part positioned below the connecting part 10 for the display of the collimated image.

In addition to this advantage and that of a use on the axis of mirror 8, can be added other advantages resulting from the forwardly inclined position of mirror 7, whose lower edge is further from point 0 than the upper edge. This arrangement enables the pilot to bend a long way forwards without any risk of striking a sharp edge of the optics or the display. Moreover, the reflection of parasitic radiation, particularly solar radiation is substantially prevented with this forward inclination of the mirror.

In should also be added that the lateral edges of glass plates 7 and 8 can be cut in the manner shown in FIG. 2, so that they are in two vertical planes forming a dihedron intersecting the straight line D at a limited distance on either side of point 0. This further increases the viewing comfort.

The electronic module 6 has a case 15 for the circuits and a cathode ray tube at 16. The spherical mirror 8 working on the axis must see tube 16 by reflection on glass plate 7. The slope of the latter on axis Y of the tube (axis passing through the centre of the screen) makes it possible to obtain direction Z passing through 0 and constituting the optical axis of the system on which is centered mirror 8. Direction Z can be chosen so as to coincide with the longitudinal axis RLF of the aircraft, or can be slightly upwards displaced with respect thereto, as is the case here. Thus, tube 16 assumes the substantially vertical position shown here, unless a further optical reflection is used, which is not impossible (FIG. 4).

Case 15 of electronic module 6 is fixed to pillar 2 and its shape is such that it is totally included in the mask of aperture w2 created by said pillar by observing it from point 0. The trailing point of the upper and lower faces of the case passing through 0 constitutes a preferred construction. Tube 16 mounted in a shield is fixed to the case and this shield is also joined to part 10 in order to support the optical module. The means (screws, bolts, etc) necessary for fixing these elements to one another and the assembly to pillar 2 are not shown for reasons of simplification and because they are known.

In the version shown in FIG. 1, only part 10 and a portion of the cathode ray tube 16 are outside the mask of pillar 2. In view of the vertical position of tube 16 and if its lateral dimensions (L. FIG. 2) remain less than the distance between the pupils (approx. 6.5 cm), it can be accepted that there is no mask in binocular vision for observing sufficiently remote points or the landscape background. It should be noted that the space between fields w1 and w2 can be reduced or even cancelled out if the connecting part 10 is integrated into the lower wall of case 15.

FIGS. 2 and 3 show the display of FIG. 1 in front view and transverse view respectively. The same elements carry the same reference numerals.

The focal surface of spherical mirror 8 is also spherical, so that the front face of the cathode ray tube must also have the same curvature as the focal surface of mirror 8. If this condition cannot be satisfied or even adequately approximated, it is necessary to provide a field correcting lens. This lens 20, cf FIG. 2, is placed in the vicinity of the front face in order to give it the correct curvature.

FIG. 4 shows another possible arrangement for a horizontally axis tube 16 along pillar 2 which is also assumed to be horizontal. Case 15 is not shown, but the tube can be placed therein. A totally reflecting mirror 21 is added for reflecting axis X along the aforementioned vertical direction Y.

FIGS. 5A and 5B illustrate the construction of the optics. Optical element 8 is considered to be of the holographic type in view of the fact that it can be a conventional glass optics. The diffraction grating or hologram 80 is preferably arranged in sandwich-like manner between the two curved glass plates 81, 82. The partly reflecting flat mirror 7 is constituted by a plate 71 and a reflecting coating 70 is placed on one face thereof.

By calling R the radius of curvature of the spherical optics constituted by element 8 the surface having the bright objects to be collimated and in this case screen 18 of cathode ray tube 16 is located at a distance $AB+BC=R/2$ from said element, the observer at 0 being at distance $OC=R$ from the spherical optics 8 on axis Z.

The radiation from screen 18 can be included in a spectral band having a clearly defined wavelength, the screen being e.g. in the case of a monochromator tube constituted by a phosphor coating emitting radiation in the range. This radiation is symbolized by the axial line R1 in FIG. 5A. It is partly reflected by mirror 7 inclined on axis Y of tube 16 in accordance with the direction BC corresponding to the optical axis Z of the system. The diffracting element 8 then reflects the radiation to point 0, where the observer's eye is located, it being understood that coating 80 is in accordance with values of the incidence angle and a selective reflection of the wavelength corresponding to the green radiation R1 emitted by screen 18. In order to facilitate understanding, a small angular separation has been shown between direction BC and return CO, this radiation reflected by optics 8 is then passed through the glass plate 7.

The radiation R2 from the outside (FIG. 5B) successively passes through the two optical elements 8 and 7, it being understood that element 8 does not dim this visible radiation except for wavelengths in the narrow spectrum of radiation R1.

As a result of the selective recording represented by hologram 80, diffractive optics 8 makes it possible to reduce to the minimum the losses by the transmission of radiation R2, which darken the view of the landscape. Recording takes place in accordance with known procedures and makes it possible to obtain a diffractive grating adapted to the narrow spectral band of the cathode ray tube, as well as to the incidence values provided. Moreover, the recording can be carried out so as to bring about convergence of the radiation R1 from the collimated image reflected in the direction of the pupil of the eye at 0. This makes it possible to significantly compensate the inevitable losses in a system centered on the axis and subject to reflection at B on 7 and then transmission through said glass plate. The glass plate 82 carrying the recording is a curved, spherical or aspherical glass plate. The diffractive element 8 can also have non-spherical mirror properties, which may make it possible to improve the optical collimation characteristics. This is dependent on the construction conditions of said element, which are chosen as a consequence of this.

The use of a diffractive optics makes it possible to obtain both a satisfactory efficiency (e.g. 15%) of the glass plate - mirror assembly 7, 8 for the emission wavelength of the cathode ray tube (FIG. 5A) ensuring a satisfactory brightness of the symbols, as well as a good transparency (e.g. 70 to 80%) for viewing the outside landscape (FIG. 5B). This is due to the photometric spectral selectivity property of a hologram, which reflects for a particular wavelength (that of the emission of the phosphor of the cathode ray tube), whilst being transparent for the remainder of the visible spectrum.

This type of system makes it possible to obtain a large total field, whilst retaining a good collimation quality, a maximum instantaneous field taking account of the constraints linked with the helicopter cabin, a satisfactory freeing of the visibility areas of the landscape about the sighting zone (no mechanical parts below the fastening) and a limited dimming of the outside landscape.

The display can supply a total circular field $\theta$ (corresponding to a circular screen 18) of angular diameter 20°. The preferred solution consists of positioning the cathode ray tube vertically as shown in FIG. 1.

The control electronics 15 of the tube are positioned flat in a dead angle formed by the canopy arch 2, without additionally prejudicing the pilot. The flat electronics makes possible an easy access and easy maintenance of the plane display.

The lateral vision disturbance to the copilot can be reduced to the minimum, if the control electronics 3 coincide with a lateral element, e.g. a door pillar, provided laterally in the helicopter.

The solution using a spherical mirror with a conventional partly reflecting treatment is sufficient in the case of an application with a less charged symbology, thus permitting a more frequent cathodic refreshening.

The control electronics 15 can be displaced in the case of multiple applications of the displays, e.g. for installation on different helicopter types.

Among other variants, consideration can also be given to the replacement of the tube by some other means (liquid crystal screens light-emitting diode matrix, etc).

What is claimed is:

1. A head-up display which does not limit an observer's field of vision for use in a carrier vehicle comprising:

optical collimation and combination means for displaying display data superimposed on a landscape to an observer;

electronic means for producing said display data to be displayed; and casing means for supporting said optical means and said electronic means and for attaching to the carrier vehicle;

said optical means including a spherical mirror and a flat mirror which are partly transparent, said mirrors having lower edges which are juxtaposed, and upper edges spaced from one another, the display being mounted in the head-up position;

a bonded thin transparent plate for assembling said juxtaposed lower edges to one another;

connecting means for mechanically connecting said upper edges to said casing means, said connecting means being of a limited thickness to be substantially contained in a plane passing through said upper edges and an optical axis of said optical means at an observation point corresponding to an optical centre of the spherical mirror, said spherical mirror being used on the optical axis, wherein a light ray reflected by said flat mirror toward said spherical mirror is again reflected by said spherical mirror in substantially a same axis as said first reflected light ray, but in an opposite direction whereby there is no masking effect in the observation field located below said connecting part which connects said upper edges, thereby eliminating any masking effect below the upper edges of said mirrors, said electronic means being at least partly contained in said casing means whose shape is predetermined so that it is located in a space already masked for the observation of the landscape from said optical centre by the presence of an opaque part belonging to the carrier vehicle.

2. A display according to claim 1, wherein the space is defined by a dihedron, whose straight line passes through said centre.

3. A display according to claim 1, further comprising a cathode ray display tube which is used for producing the display data on a screen disposed in the focal plane of the optical collimation means, said tube being arranged vertically and transversely to the casing means through which it passes and being mechanically coupled on the side of the cathode ray display tube where said screen is located to the connecting part for the mirrors.

4. A display according to claim 3, wherein the optical means further includes a field correcting lens for correcting the curvature of the front face of the cathode ray tube.

5. A display according to claim 1, further comprising a cathode ray display tube which is used for producing the display data on the screen located in the focal plane of the optical collimation means, said tube being arranged horizontally and contained substantially in the casing means, and the optical means further including a mirror for reflecting the screen image towards the flat mirror.

6. A display according to claim 5, wherein the optical means further includes a field correcting lens for correcting the curvature of the front face of the cathode ray tube.

7. A display according to claim 1, wherein the flat mirror produces a partial reflection of the radiation of the display data towards the spherical mirror, which in turn reflects this radiation once again towards the flat mirror along the same axis which it traverses in the direction of said optical centre, the radiation from the lanscape being transmitted through the spherical mirror and then through the flat mirror.

8. A display according to claim 7, wherein the spherical mirror is constituted by a holographic mirror defined in such a way as to minimize the losses by reflection and transmission of the respective radiations.

9. A display according to claim 8, wherein the holographic mirror has non-spherical mirror properties defined so as to minimize the optical aberrations and improve the collimation quality.

10. A display according to claim 2, used on a helicopter, wherein the case adopts the shape of the mask produced by part of a pillar supporting the canopy, in such a way that the actual display introduces no masking effect for the observation from said centre.

11. A display according to claim 8 used on a helicopter, wherein the case adopts the shape of the mask produced by part of a pillar supporting the canopy, in such a way that the actual display introduces no masking effect for the observation from said centre.

12. A display according to claim 9 used on a helicopter, wherein the case adopts the shape of the mask produced by part of a pillar supporting the canopy, in such a way that the actual display introduces no masking effect for the observation from said centre.

* * * * *